(12) United States Patent
Numazaki et al.

(10) Patent No.: US 8,496,225 B2
(45) Date of Patent: Jul. 30, 2013

(54) VALVE DEVICE

(75) Inventors: Kazushi Numazaki, Toyota (JP); Yoshinori Imoto, Kariya (JP); Yutaka Inada, Kariya (JP); Hiroaki Suzuki, Nagoya (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/442,326

(22) Filed: Apr. 9, 2012

(65) Prior Publication Data
US 2012/0273059 A1 Nov. 1, 2012

(30) Foreign Application Priority Data

Apr. 26, 2011 (JP) ................................ 2011-098242

(51) Int. Cl.
*F16K 41/00* (2006.01)
*F16K 37/00* (2006.01)
*G01K 1/08* (2006.01)

(52) U.S. Cl.
USPC ............ 251/144; 137/551; 137/560; 374/141

(58) Field of Classification Search
USPC ..................... 251/144; 137/560, 551; 374/141
See application file for complete search history.

(56) References Cited

U.S. PATENT DOCUMENTS

| 5,458,151 | A  | * | 10/1995 | Wass ............................. 137/613 |
| 7,547,001 | B2 | * | 6/2009  | Kamiya et al. ............ 251/129.22 |
| 8,316,877 | B2 | * | 11/2012 | Numazaki et al. ............. 137/312 |
| 2002/0108656 | A1 | * | 8/2002 | Miller et al. .................. 137/560 |
| 2003/0151018 | A1 | * | 8/2003 | Teshima et al. ................ 251/332 |
| 2009/0285650 | A1 | * | 11/2009 | Numazaki et al. ............. 411/103 |

* cited by examiner

*Primary Examiner* — John Rivell
*Assistant Examiner* — Daphne M Barry
(74) *Attorney, Agent, or Firm* — Oliff & Berridge, PLC

(57) ABSTRACT

A valve device includes a wire channel through which wires are routed from the inside of a gas tank to the outside of the gas tank, and a hermetic connector in which a sealing member is provided around wire pins that constitute part of the wires is provided in the wire channel. In addition, the wire channel has multiple (two) bent portions formed on the outer side of the hermetic connector. When pulling force acts on the wires from the outside, stress concentration portions are formed in the wires at these bent portions.

5 Claims, 5 Drawing Sheets

VALVE DEVICE

INCORPORATION BY REFERENCE/RELATED APPLICATION

This application claims priority to Japanese Patent Application No. 2011-098242 filed on Apr. 26, 2011 the disclosure of which, including the specification, drawings and abstract, is incorporated herein by reference in its entirety.

BACKGROUND OF THE INVENTION

1. Field of the Invention

The invention relates to a valve device that includes a wire channel through which a wire is routed from the inside of a tank to the outside of the tank.

2. Discussion of Background

Usually, a valve device fitted to a high-pressure gas tank includes a gas passage that provides communication between the inside of a gas tank and the outside of the gas tank, and a valve mechanism that controls the flow rate of high-pressure gas delivered through the gas passage. For example, a valve device described in US 2003/0151018 includes a solenoid valve that serves as a valve mechanism used to control gas supply. In this valve device, a power supply wire for the solenoid valve is drawn to the outside of a gas tank through a casing of the valve device without passing through the inside of the gas tank. Thus, high hermeticity is ensured.

However, for example, some hydrogen gas tanks for a fuel-cell vehicle have a temperature sensor arranged therein. In this case, a wire channel that provides communication between the inside and outside of the gas tank needs to be fowled in order to draw wires for the temperature sensor to the outside of the tank. Conventionally, in order to seal such a wire channel, there is used a hermetic connector in which a sealing member is arranged around wire pins that constitute part of the wires.

For example, a conventional hermetic connector 61 shown in FIG. 8 includes a tubular body 63 that is arranged in a wire channel 62 to extend along the axis of the wire channel 62, wire pins 64 that extend through the tubular body 63, and an O-ring 65 that serves as a seal member for hermetically sealing the gap between the outer periphery of the tubular body 63 and the inner periphery of the wire channel 62. The hermetic connector 61 is configured such that the gaps between the inner periphery of the tubular body 63 and the wire pins 64 are hermetically sealed by a sealing member 66 provided within the tubular body 63.

However, a hard material, such as ceramic and glass, is usually used as a sealing member of such a hermetic connector. Therefore, if wires are pulled from the outside with excessive force, wire pins may be pulled out of a portion of the hermetic connector, at which the sealing member is arranged, by the pulling force. This may reduce the hermeticity.

SUMMARY OF THE INVENTION

The invention provides a valve device in which wire pins do not come out of a hermetic connector even if pulling force acts on wires passed through a wire channel.

According to a feature of an example of the invention, there is provided a valve device that includes: a gas passage that provides communication between the inside and outside of a gas tank that stores high-pressure gas; a valve mechanism that controls the flow rate of the high-pressure gas delivered through the gas passage; and a wire channel through which a wire is routed from the inside of the gas tank to the outside of the gas tank, a hermetic connector in which a sealing member is provided around a wire pin that constitutes part of the wire being provided in the wire channel, wherein the wire channel has a bent portion that is formed on the outer side of the hermetic connector, and that bends the wire in accordance with pulling force that acts on the wire to form a stress concentration portion in the wire.

Even when pulling force acts on the wire from the outside, the stress concentration portion is formed on the outer side of the hermetic connector. Therefore, the force that acts on the wire pin in accordance with the pulling force, that is, the force that pulls the wire pin out of a portion of the hermetic connector, in which the sealing member is provided is reduced. As a result, it is possible to effectively prevent the wire pin from coming out of the hermetic connector with a simple configuration.

According to another feature of an example of the invention, the wire is configured to break at the stress concentration portion before the wire pin comes out of the portion of the hermetic connector, in which the sealing member is provided, in accordance with the pulling force that acts on the wire.

According to a further feature of an example of the invention, a plurality of the bent portions is formed in the wire channel.

According to another feature of the invention, the valve device further includes: a body in which the wire channel is formed; and a lid member that is detachably fitted to the body, wherein the bent portion is exposed to the outside of the body when the lid member is removed from the body.

Forming the bent portion in the wire channel makes it difficult to pass the wire through the wire channel. However, the lid member is provided to allow the bent portion to be exposed to the outside. Therefore, it is possible to easily carry out the work for passing the wiring through the wire channel.

According to another aspect of the invention, the gas passage and an accommodation chamber that accommodates the valve mechanism are formed in the body, and the wire channel is formed to be contiguous with the accommodation chamber such that a passage connected to the bent portion is opened to the outside of the body together with the accommodation chamber when the lid member is removed from the body.

The accommodation chamber for the valve mechanism is utilized as a work space for passing the wire through the wire channel. As a result, it is possible to further easily carry out the work for passing the wire through the wire channel. In addition, when the valve mechanism is a solenoid valve, a power supply wire for the solenoid valve together with the wire is drawn to the outside of the body through the wire channel. Thus, it is possible to simplify the configuration by, for example, omitting a seal member (grommet), and reduce the cost.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereafter, embodiments of the invention will be described with reference to the accompanying drawings.

Figure 1:
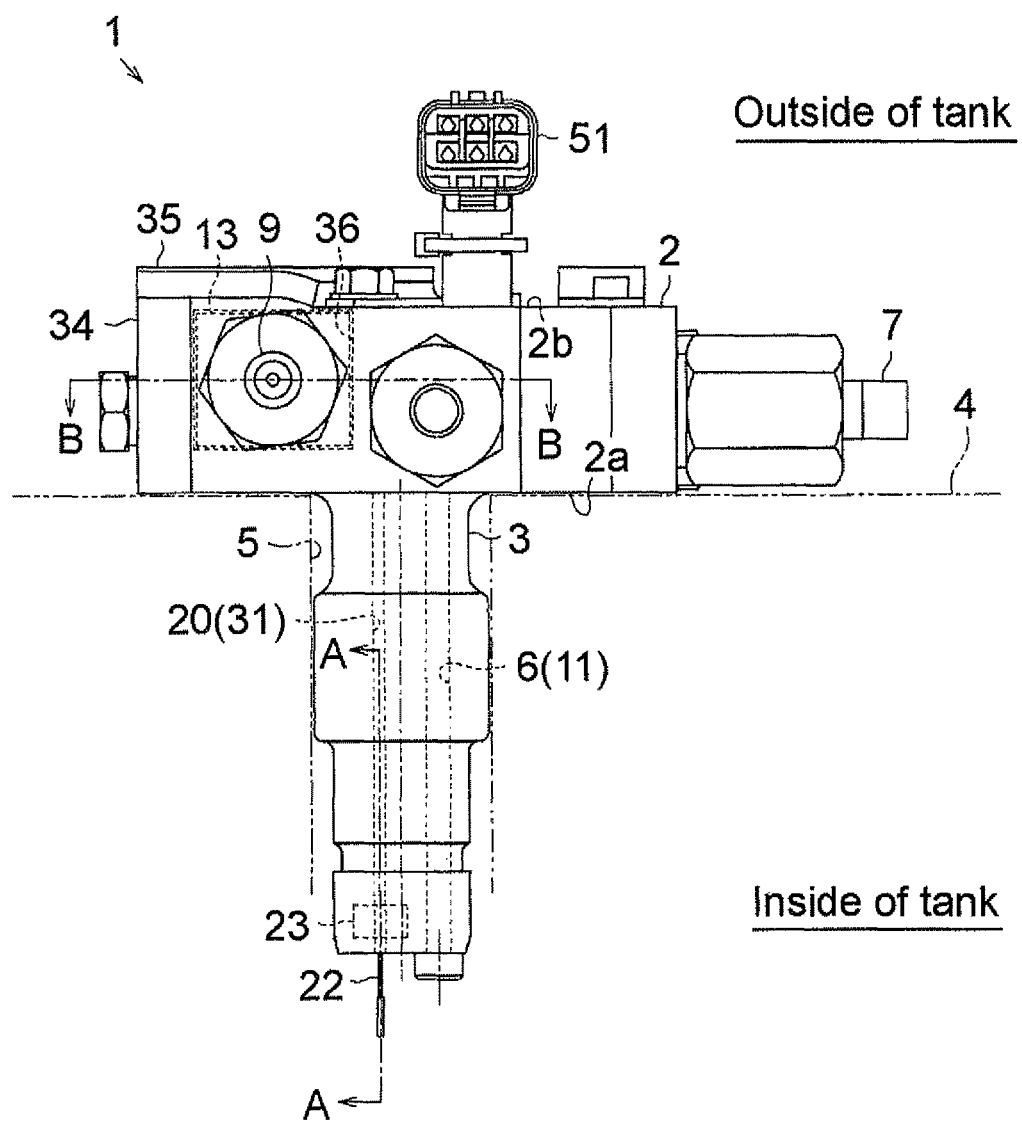
FIG. 1 is a side view of a valve device according to the invention.

As shown in FIG. 1, a valve device 1 according to an embodiment includes a substantially box-shaped tank-outside arranged portion 2, and a substantially circular cylindrical tank-inside arranged portion 3. The tank-inside arranged portion 3 extends in a direction substantially perpendicular to a bottom face 2a of the tank-outside arranged portion 2 (downward in FIG. 1). The valve device 1 is fitted to a gas tank 4 in such a manner that the tank-inside arranged portion 3 is installed in an installation port 5 of the gas tank 4 that stores high-pressure hydrogen gas.

Figure 2:
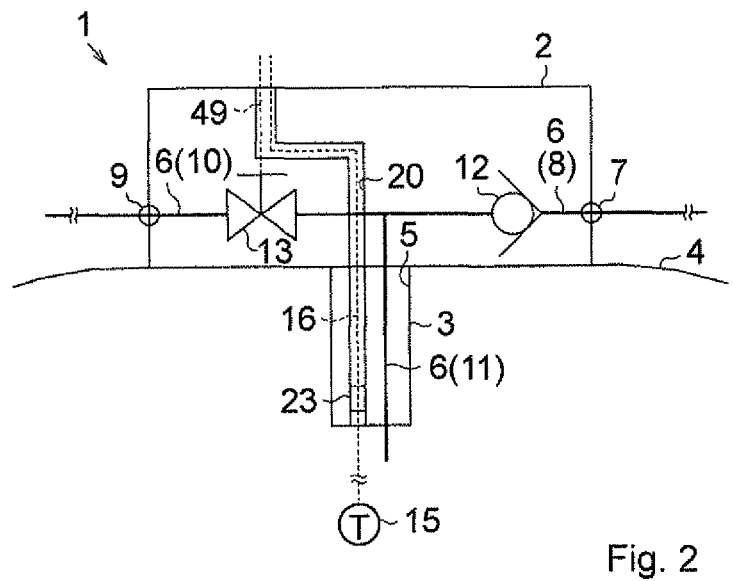
FIG. 2 is a schematic configuration diagram of the valve device shown in FIG. 1.

As shown in FIG. 2, the valve device 1 has a gas passage 6 that provides communication between the inside and outside of the gas tank 4. A valve mechanism is provided in an intermediate portion of the gas passage 6. The valve mechanism controls the flow rate of high-pressure hydrogen gas delivered through the gas passage 6.

More specifically, a charging passage 8 and a delivery passage 10 are formed within the tank-outside arranged portion 2. The charging passage 8 communicates with a charging port 7 through which the high-pressure hydrogen gas is charged into the gas tank 4. The delivery passage 10 communicates with a delivery port 9 through which the high-pressure hydrogen gas is delivered. In the tank-inside arranged portion 3, a connection passage 11 is formed. The connection passage 11 extends through the tank-inside arranged portion 3 along the axis of the tank-inside arranged portion 3 and opens into the gas tank 4. In the valve device 1 according to the present embodiment, the charging passage 8, the delivery passage 10 and the connection passage 11 are connected to each other to form the gas passage 6.

In addition, in the valve device 1 according to the present embodiment, a check valve 12 is provided in an intermediate portion of the charging passage 8. The check valve 12 prevents backflow of the high-pressure hydrogen gas from the gas tank 4. A solenoid valve 13 is provided in an intermediate portion of the delivery passage 10. The solenoid valve 13 is used to control supply of the high-pressure hydrogen gas through the delivery port 9.

In the present embodiment, a temperature sensor 15 is provided inside the gas tank 4. The temperature sensor 15 is used to measure the temperature of the high-pressure hydrogen gas stored in the gas tank 4. The valve device 1 according to the present embodiment has a wire channel 20 through which wires 16 for the temperature sensor 15 are routed from the inside of the gas tank 4 to the outside of the gas tank 4.

Figure 3:
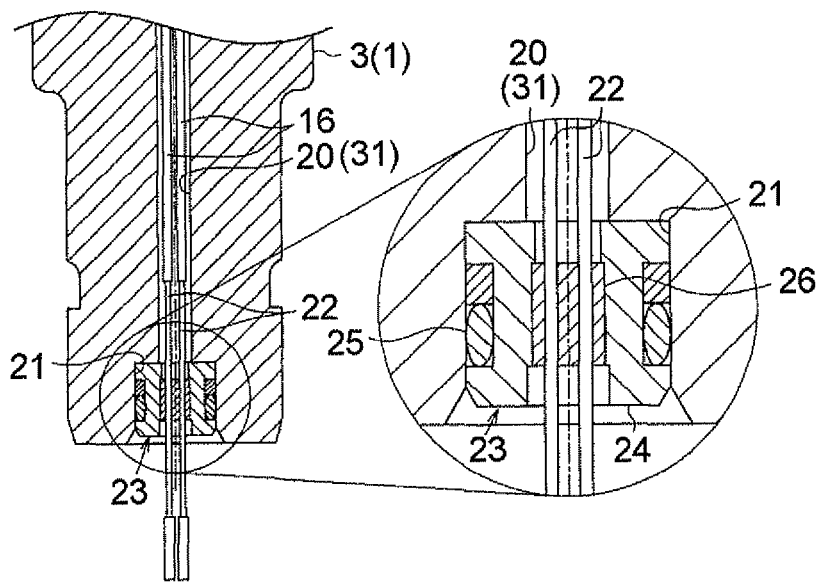
FIG. 3 is a sectional view taken along the line A-A in FIG. 1.

More specifically, as shown in FIG. 1 and FIG. 3, the wire channel 20 includes a first passage 31 that extends through the tank-inside arranged portion 3 along the axis of the tank-inside arranged portion 3 and that opens into the gas tank 4, as in the case of the connection passage 11 that constitutes the gas passage 6. A hermetic connector 23 is provided in an in-tank opening 21 of the first passage 31. The hermetic connector 23 is provided with wire pins 22 that constitute part of the wires 16, and provides hermetic sealing between the inside and outside of the gas tank 4.

As shown in FIG. 3, in the present embodiment, the in-tank opening 21 is formed to be larger in diameter than the other portion of the first passage 31. The hermetic connector 23 includes a tubular body 24 formed to have substantially the same diameter as that of the in-tank opening 21, and the wire pins 22 extend through the tubular body 24. In addition, an O-ring 25 that serves as a seal member is fitted to the outer periphery of the tubular body 24. A sealing member 26 is provided in the tubular body 24. The sealing member 26 hermetically seals the gap between the inner periphery of the tubular body 24 and the outer peripheries of the wire pins 22.

Furthermore, the wires 16 are connected to both ends of the wire pins 22. The hermetic connector 23 according to the present embodiment is configured to provide hermetic sealing between the inside and outside of the gas tank 4 when the tubular body 24 is fitted in the in-tank opening 21.

Figure 4:
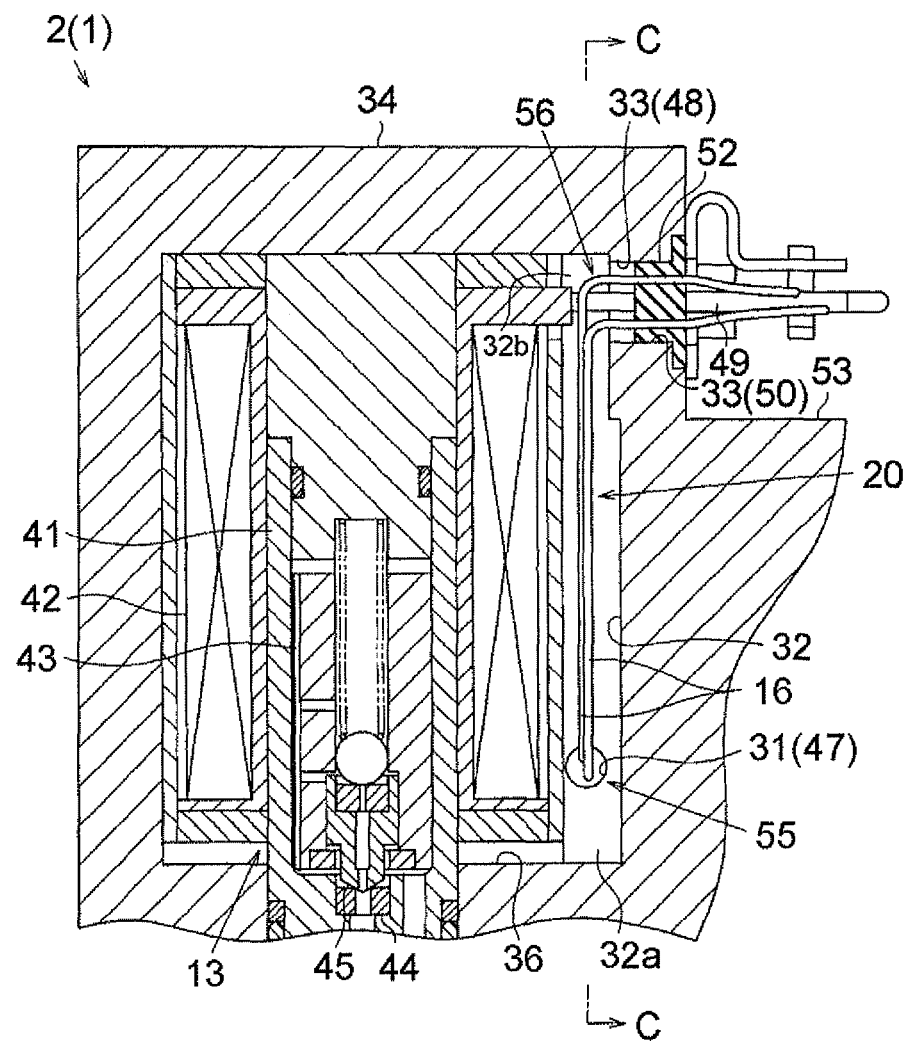
FIG. 4 is a sectional view taken along the line B-B in FIG. 1.

In addition, as shown in FIG. 4, the tank-outside arranged portion 2 has a second passage 32 and a third passage 33. When the second passage 32 and the third passage 33 are connected to the first passage 31 formed in the tank-inside arranged portion 3 as described above, the second and third passages 32, 33 constitute the wire channel 20 together with the first passage 31.

More specifically, as shown in FIG. 1, the tank-outside arranged portion 2 according to the present embodiment includes a body 34 and a lid member 35. The body 34 has the second passage 32, the gas passage 6 and the valve mechanism such as the solenoid valve 13. The lid member 35 is detachably fitted to the body 34. In addition, the tank-outside arranged portion 2 according to the present embodiment is configured such that, when the lid member 35 is removed from the body 34, an accommodation chamber for the solenoid valve 13 (solenoid valve accommodation chamber 36), formed inside the body 34, is opened to the outside. As shown in FIG. 4, the second passage 32 is formed to be contiguous with the solenoid valve accommodation chamber 36 so that the second passage 32 is opened to the outside of the body 34 together with the solenoid valve accommodation chamber 36 when the lid member 35 is removed from the body 34.

More specifically, the solenoid valve 13 according to the present embodiment includes a cylinder 41 with a bottom, an electromagnetic coil 42, and a plunger 43. The electromagnetic coil 42 is wound around the outer periphery of the cylinder 41. The plunger 43 slides inside the cylinder 41 in the axial direction on the basis of a magnetomotive force of the electromagnetic coil 42. The solenoid valve 13 has a known configuration in which a valve element 45 is pushed against or moved away from a valve seat 44 in accordance with axial movement of the plunger 43.

The second passage 32 according to the present embodiment is contiguous with the solenoid valve accommodation chamber 36 in which the above solenoid valve 13 is accommodated, and extends in a direction along the axis of the cylinder 41 (up-down direction in FIG. 4). One end of the first passage 31 opens into the second passage 32 at a position near an end portion (lower end portion in FIG. 4) 32a of the second passage 32. In this way, the second passage 32 is connected to the first passage 31.

In addition, the third passage 33 opens into the second passage 32 at a position near the other end portion (upper end portion in FIG. 4) 32b that is on the opposite side of the second passage 32 from the end 32a connected to the first passage 31. Thus, the third passage 33 provides communication between the second passage 32 and the outside of the body 34.

The tank-outside arranged portion 2 according to the present embodiment is configured such that an opening 47 of the first passage 31 and an opening 48 of the third passage 33, which open into the second passage 32, are exposed to the outside of the body 34 when the lid member 35 is removed from the body 34 as described above.

That is, in the valve device 1 according to the present embodiment, the wires 16 drawn into the second passage 32 from the first passage 31 are routed through the second passage 32 and then drawn to the outside through the third passage 33. In addition, in the present embodiment, a power supply wire 49 for the solenoid valve 13 is also drawn to the outside, together with the wires 16, through the third passage 33. The gaps between the wires 16 and power supply wire 49, and the inner periphery of the third passage 33 are hermetic sealed by a grommet 52 that is attached to a body-outside opening 50 of the third passage 33.

Note that the valve device 1 according to the present embodiment is provided with a connector 51 that protrudes from an upper face 2b of the tank-outside arranged portion 2 (see FIG. 1), and the body-outside opening 50 of the third passage 33 is formed at a position corresponding to an installation portion 53 of the connector 51. The wires 16 and the power supply wire 49 drawn to the outside of the body 34 are connected to the connector 51.

Figure 5:
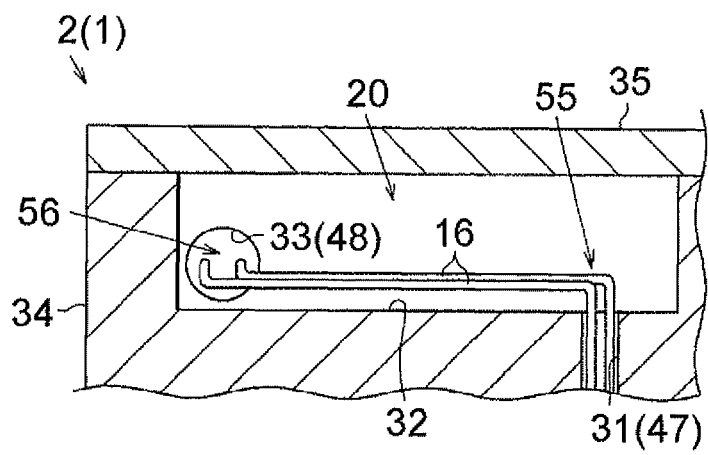
FIG. 5 is a sectional view taken along the line C-C in FIG. 4.

Next, a configuration for preventing the wire pins from coming out of the hermetic connector in the valve device according to the present embodiment will be described. As shown in FIG. 4 and FIG. 5, in the valve device 1 according to the present embodiment, the second passage 32 is formed to be substantially perpendicular to the first passage 31. In addition, the third passage 33 is formed to be substantially perpendicular to the second passage 32. Thus, the first passage 31 and the third passage 33 are arranged at skew positions.

In the valve device 1 according to the present embodiment, by arranging the first passage 31, the second passage 32 and the third passage in the above-described manner, two bent portions 55, 56 are formed at portions on the outer side of the hermetic connector 23 in the wire channel 20. Thus, the valve device 1 according to the present embodiment is configured such that the wire pins 22 are prevented from coming out of the hermetic connector 23.

Figure 6:
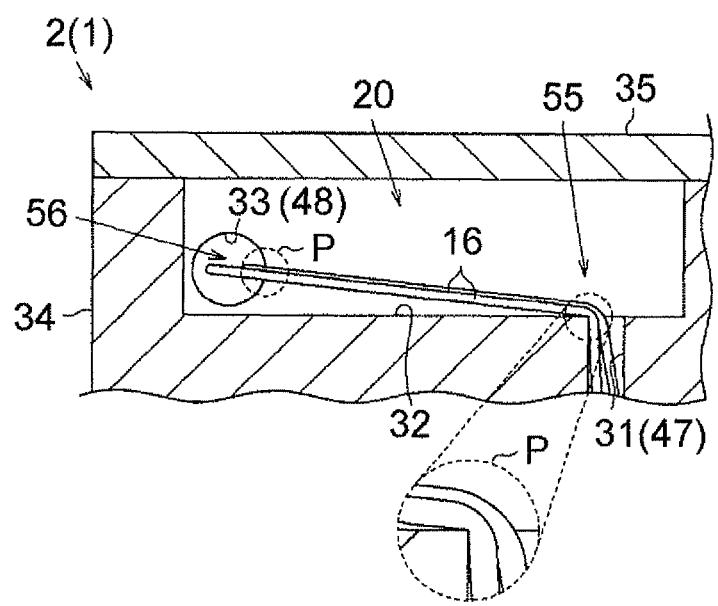
FIG. 6 is an operation illustration of bent portions formed in a wire channel.
Figure 7:
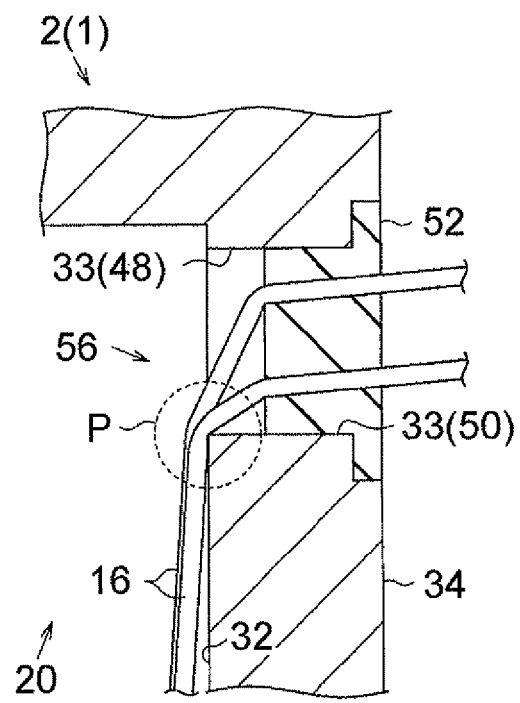
FIG. 7 is an operation illustration of one of the bent portions formed in the wire channel.
Figure 8:
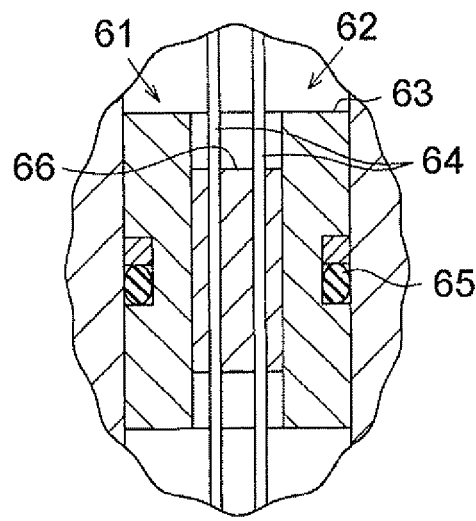
FIG. 8 is a schematic configuration diagram of a conventional hermetic connector.

More specifically, as shown in FIG. 6 and FIG. 7, when the wires 16 of the valve device 1 according to the present embodiment are pulled from the outside, stress concentration portions P are formed in the wires 16 at the bent portions 55, 56.

Specifically, at the bent portion 55 between the first passage 31 and the second passage 32, the wires 16 are brought into contact with and caught on the inner peripheral edge of the opening 47 of the first passage 31. Thus, the stress concentration portion P is formed in the wires 16 on the basis of the pulling force. Similarly, at the bent portion 56 between the second passage 32 and the third passage 33, the wires 16 are brought into contact with and caught on the inner peripheral edge of the opening 48 of the third passage 33 that opens into the second passage 32. Thus, the stress concentration portion P is formed on the basis of the pulling force. In the valve device 1 according to the present embodiment, the wire pins 22 are prevented from coming out of the hermetic connector 23 by forming the stress concentration portions P at portions at which the wires 16 are bent.

That is, when the wires 16 are pulled from the outside, force that pulls the wire pins 22 out of the portion, at which the sealing member 26 is provided, acts on the hermetic connector 23. However, as described above, the stress concentration portions P are formed on the outer side of the gas tank with respect to the hermetic connector 23. Therefore, force that acts on the wire pins 22 is reduced. Further, the valve device 1 according to the present embodiment is configured such that, when larger pulling force acts on the wires 16, the wires 16 break at the stress concentration portions P before the wire pins 22 come out of the portion at which the sealing member 26 is provided.

According to the present embodiment, the following advantageous effects are obtained.

(1) The valve device 1 includes the wire channel 20 through which the wires 16 are routed from the inside of the gas tank 4 to the outside of the gas tank 4, and the hermetic connector 23, in which the sealing member 26 is provided around the wire pins 22 that constitute part of the wires 16, is provided inside the wire channel 20. In addition, multiple (two) bent portions 55, 56 are formed on the outer side of the gas tank 4 with respect to the hermetic connector 23 in the wire channel 20. When pulling force acts on the wires 16 from the outside, the stress concentration portions P are formed in the wires 16 at these bent portions 55, 56.

That is, even when pulling force acts on the wires 16 from the outside, the stress concentration portions P are formed on the outer side of the gas tank with respect to the hermetic connector 23, and therefore force that acts on the wire pins 22 on the basis of the pulling force, that is, force that pulls the wire pins 22 out of the portion, in which the sealing member 26 is provided, is reduced. Thus, with the above-described simple configuration, it is possible to effectively prevent the wire pins 22 from coming out of the hermetic connector 23. The multiple bent portions (55, 56) are formed in the wire channel 20 to form the multiple stress concentration portions P in the wires 16. Therefore, it is possible to obtain a further remarkable advantageous effect.

(2) The valve device 1 is configured such that, before the wire pins 22 come out of the portion in which the sealing member 26 is provided, the wires 16 break at the stress concentration portions P. Thus, it is possible to further reliably prevent the wire pins 22 from coming out of the hermetic connector 23.

(3) The wire channel 20 is formed such that each of the angle formed between the first passage 31 and the second passage 32 that are connected to each other via the bent portion 55 and the angle formed between the second passage 32 and the third passage 33 that are connected via the bent portion 56 are substantially a right angle. Thus, it is possible to form the effective stress concentration portions P.

(4) The wire channel 20 is formed such that, among the first passage 31, the second passage 32 and the third passage 33 that are contiguous with each other via the two bent portions 55, 56, the first passage 31 and the third passage 33 that are located at both ends of the wire channel 20 are arranged at skew positions. With the above configuration, it is possible to form the effective stress concentration portions P.

(5) The tank-outside arranged portion 2 includes the body 34 and the lid member 35. The body 34 has the second passage 32, the gas passage 6 and the valve mechanism such as the solenoid valve 13. The lid member 35 is detachably fitted to the body 34. The tank-outside arranged portion 2 is configured such that the two bent portions 55, 56 that are formed in the wire channel 20 (the opening 47 of the first passage 31 and the opening 48 of third passage 33, which open into the second passage 32) are exposed to the outside of the body 34 when the lid member 35 is removed from the body 34.

Forming the bent portions 55, 56 in the wire channel 20 makes it difficult to pass the wires 16 through the wire channel 20. However, with the above configuration, the bent portions 55, 56 are exposed to the outside, it is possible to easily carry out the work for passing the wires 16 through the wire channel 20.

(6) The tank-outside arranged portion 2 is configured such that, when the lid member 35 is removed from the body 34, the solenoid valve accommodation chamber 36, formed inside the body 34, is opened to the outside. The second passage 32 is formed to be contiguous with the solenoid valve accommodation chamber 36 so that the second passage 32 is opened to the outside of the body 34 together with the solenoid valve accommodation chamber 36 when the lid member 35 is removed from the body 34.

With the above configuration, the solenoid valve accommodation chamber 36 is utilized as a working space for passing the wires 16 through the wire channel 20. As a result, it is possible to further easily pass the wires 16b through the wire channel 20. In addition, the power supply wire 49 for the solenoid valve 13 is drawn to the outside of the body 34 through the wire channel 20 (third passage 33) together with the wires 16. Thus, it is possible to simplify the configuration by, for example, omitting a seal member (grommet 42), and reduce the cost.

Note that the above-described embodiment may be modified into the following alternative embodiments.

In the above-described embodiment, the invention is applied to the valve device 1 fitted to the gas tank 4 that stores high-pressure hydrogen. However, the invention is not limited to this, and the invention may be applied to a valve device for another high-pressure gas tank.

In the above-described embodiment, the two bent portions 55, 56 are formed in the wire channel 20. However, the invention is not limited to this, and the number of the bent portions may be one or may be three or more.

In the above-described embodiment, the angle formed between the two passages (31 and 32; 32 and 33) that are connected via the bent portion (55; 56) is substantially a right angle. However, an effective stress concentration portion P may also be formed even when the angle is an acute angle. Note that, as long as it is possible to effectively prevent the wire pins 22 from coming out of the hermetic connector 23, the angles may be changed as appropriate.

In the above-described embodiment, among the first passage 31, the second passage 32 and the third passage 33 that are contiguous with each other via the two bent portions 56 and 56, the first passage 31 and the third passage 33 that are located at both ends are arranged at skew positions. However, as long as it is possible to effectively prevent the wire pins 22 from coming out of the hermetic connector 23, the arrangement may be changed as appropriate.

In the above-described embodiment, the second passage 32 together with the solenoid valve accommodation chamber 36 is opened to the outside of the body 34 when the lid member 35 is removed from the body 34. When the lid member 35 is removed from the body 34, the two bent portions 55, 56 formed in the wire channel 20 are exposed to the outside of the body 34. However, the invention is not limited to this. There may be employed a configuration in which at least one of the bent portions 55, 56 is exposed to the outside of the body 34 when the lid member 35 is removed from the body 34.

In addition, there may be employed a configuration in which part of the wire channel together with an accommodation chamber for accommodating a valve mechanism, other than the solenoid valve 13, is open to the outside of the body 34 when the lid member 35 is removed from the body 34. With this configuration as well, it is possible to easily carry out the work for passing the wires 16 through the wire channel 20 using the accommodation chamber as a working space.

Next, the technical ideas ascertained from the above-described embodiments will be described with their advantageous effects.

(1) A valve device characterized in that an angle formed between two passages connected via the bent portion is a right angle or an acute angle.

(2) A valve device characterized in that, among multiple passages that are contiguous with each other via the multiple bent portions, the two passages located at both ends are arranged at skew positions.

With the above configurations, it is possible to form an effective stress concentration portions.

What is claimed is:

1. A valve device that includes: a gas passage that provides communication between an inside and an outside of a gas tank that stores high-pressure gas; a valve mechanism that controls a flow rate of the high-pressure gas delivered through the gas passage; and a wire channel through which a wire is routed from the inside of the gas tank to the outside of the gas tank, a hermetic connector in which a sealing member is provided around a wire pin that constitutes part of the wire being provided in the wire channel, wherein
the wire channel has a bent portion that is formed on an outer side of the hermetic connector, and that bends the wire in accordance with pulling force that acts on the wire to form a stress concentration portion in the wire.

2. The valve device according to claim 1, wherein
the wire is configured to break at the stress concentration portion before the wire pin comes out of a portion of the hermetic connector, in which the sealing member is provided, in accordance with the pulling force that acts on the wire.

3. The valve device according to claim 1, wherein
a plurality of the bent portions is formed in the wire channel.

4. The valve device according to claim 1, further comprising:
a body in which the wire channel is formed; and
a lid member that is detachably fitted to the body, wherein
the bent portions are exposed to an outside of the body when the lid member is removed from the body.

5. The valve device according to claim 4, wherein
the gas passage and an accommodation chamber that accommodates the valve mechanism are formed in body, and
the wire channel is formed to be contiguous with the accommodation chamber such that a passage connected to the bent portion is opened to the outside of the body together with the accommodation chamber when the lid member is removed from the body.

* * * * *